(12) United States Patent
Peng (10) Patent No.: US 11,067,198 B1
(45) Date of Patent: Jul. 20, 2021

(54) STEERING DRIVE DEVICE FOR PRESSING-CONTROLLED VALVE CORE

(71) Applicant: KUCHING INTERNATIONAL LTD., Taichung (TW)

(72) Inventor: Hao-Nan Peng, Taichung (TW)

( * ) Notice: Subject to any disclaimer, the term of this patent is extended or adjusted under 35 U.S.C. 154(b) by 0 days.

(21) Appl. No.: 17/029,318

(22) Filed: Sep. 23, 2020

(51) Int. Cl.
| | |
|---|---|
| *F16K 3/08* | (2006.01) |
| *F16K 31/524* | (2006.01) |
| *F16K 31/528* | (2006.01) |
| *F16K 31/56* | (2006.01) |
| *F16K 1/24* | (2006.01) |
| *F16K 11/074* | (2006.01) |

(52) U.S. Cl.
CPC ............. *F16K 31/563* (2013.01); *F16K 1/24* (2013.01); *F16K 3/08* (2013.01); *F16K 31/5286* (2013.01); *F16K 31/52475* (2013.01); *F16K 11/0743* (2013.01); *F16K 11/0746* (2013.01)

(58) Field of Classification Search
CPC ...................... F16K 31/563; F16K 1/24; F16K 11/0782–0787; F16K 11/074; F16K 11/0743–0746; F16K 19/006; F16K 31/52483; F16K 31/52466; F16K 31/5286; F16K 3/08–085; Y10T 137/86549; Y10T 137/86815; Y10T 137/86823; Y10T 137/9646
See application file for complete search history.

(56) References Cited

U.S. PATENT DOCUMENTS

| | | | | |
|---|---|---|---|---|
| 1,765,377 A | * | 6/1930 | Marks | F16K 31/105 251/129.2 |
| 3,096,966 A | * | 7/1963 | McFarland, Jr. | F16K 5/0647 251/214 |
| 3,220,695 A | * | 11/1965 | Jones | E03C 1/2306 251/263 |
| 4,632,361 A | * | 12/1986 | Callison | A01G 25/165 137/624.14 |
| 4,784,180 A | * | 11/1988 | Sieberhagen | F16K 11/14 137/607 |
| 8,276,833 B2 | * | 10/2012 | Cheng | E03C 1/0409 239/447 |
| 8,602,058 B1 | * | 12/2013 | Del Castillo | A61M 39/223 137/625.47 |

(Continued)

FOREIGN PATENT DOCUMENTS

DE 202017104376 U1 * 8/2017 ............ F16K 11/074

*Primary Examiner* — Marina A Tietjen (57) ABSTRACT

Disclosed is steering drive device for a pressing-controlled valve core, the steering drive device including a fixed top frame, a lifting drive rod, a vertical guide column, a lifting receiving seat, a fork-shaped swinging member, and a steering linkage. The steering linkage has an end that swings laterally when being moved, and the laterally swinging end is provided with a through hole for the fork-shaped swinging member to drive the swing arm, and cause the horizontal post to axially slide. The vertical cross-section of the through hole is rectangular, and the drive horizontal column has a range of up and down movement space in it, so that, when the drive swing arm generates lateral displacement due to vertical swing, it will pull the steering linkage along a circular path laterally moving, and at the same time drives the valve to rotate the actuating seat and cause it rotate laterally.

5 Claims, 9 Drawing Sheets

(56) References Cited

U.S. PATENT DOCUMENTS

| | | | |
|---|---|---|---|
| 2010/0193721 A1* | 8/2010 | Melle | F16K 11/074 |
| | | | 251/213 |
| 2016/0327175 A1* | 11/2016 | Thurau | F16K 31/003 |
| 2019/0024820 A1* | 1/2019 | Thurau | F16K 3/24 |
| 2019/0178398 A1* | 6/2019 | Stulz | F16K 19/006 |

* cited by examiner

STEERING DRIVE DEVICE FOR PRESSING-CONTROLLED VALVE CORE

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The present invention relates generally to a pressing-controlled valve core, and more particularly to an innovative steering drive device for a pressing-controlled valve core.

2. Description of Related Art Including Information Disclosed Under 37 CFR 1.97 and 37 CFR 1.98

The pressing-controlled valve core referred to in the present invention means a valve core with a pressing-controlled linkage device to control the output flow rate.

In the conventional pressing-controlled linkage device provided in a pressing-controlled valve core, the water flow is controlled through the up-and-down movement of a straight vertical mechanism. However, the main water control mechanism of a ceramic valve is normally made up of a moving ceramic chip and a water control ceramic chip tightly laminated on each other. In operation, the moving ceramic chip is driven indirectly by the handle of the water tap to rotate or move laterally to change the alignment of the corresponding water flow holes, so as to achieve the function of water flow control.

As obviously seen from the above description, the up-and-down movement of the conventional pressing-controlled linkage device can not directly drive the moving ceramic chip to rotate or have a lateral displacement. Therefore, the pressing-controlled linkage device configured in the conventional pressing-controlled valve core can only achieve the function of water flow control through its up-and-down movement mechanism with additional components to match the existing valve or alteration of the water passage. Thus, the driving structure of the pressing-controlled valve core is limited and cannot be changed flexibly, and subsequently cannot meet the diversified needs on either the manufacturer or the client end. This is indeed a regretful problem.

BRIEF SUMMARY OF THE INVENTION

The main objective of the present invention is to provide a steering drive device for pressing-controlled valve core. It aims to find a technical solution to develop an innovative pressing-controlled valve core the steering drive device which can transform the vertical up-and-down movement of the pressing component into transverse rotary motion through a steering linkage mechanism, making it more ideal and practical.

In the present invention is a steering drive device for pressing-controlled valve core, the steering drive device being installed between a pressing-controlled lifting actuator and a valve rotation actuating seat provided in the shell of a pressing-controlled valve core, to transform the up-and-down movement into rotary motion; said steering drive device comprises:

a fixed top frame, installed and positioned inside the shell at a certain height, with a vertical interval separating it from the valve rotation actuating seat, said fixed top frame being formed with a vertical through hole facing the pressing-controlled lifting actuator;

a lifting drive rod, including a rod top, a rod body and a rod bottom section, wherein the rod top is configured below the pressing-controlled lifting actuator in a linked state, the rod body goes through the vertical through hole formed on the fixed top frame, capable of moving up and down in the axial direction;

at least one vertical guide column, the top end of said vertical guide column linked and positioned on the fixed top frame, the lower end of said vertical guide column is extended downward for a preset length in the direction toward the valve rotation actuating seat;

a lifting receiving seat, configured on the rod bottom section of the lifting drive rod, said lifting receiving seat formed with slide sleeve holes, the number of slide sleeve holes matching that of the vertical guide columns, so that the slide sleeve holes can be sleeved on the vertical guide columns in a state enabling sliding, said lifting receiving seat being located at a position away from the slide sleeve holes and formed with a receiving plughole and at least one transverse guide groove, wherein said receiving plughole is for the rod bottom section to plug in to form a linked relationship;

at least one fork-shaped swinging member, located on the neighboring side of the lifting receiving seat, said fork-shaped swinging member formed with a top end rotational support, forking and extending downward to define a receiving swing arm and a drive swing arm, wherein said top end rotational support is pivoted on the fixed top frame, so that, when being moved, the receiving swing arm and the drive swing arm will swing, with the top end rotational support as the support point; the receiving swing arm having a receiving horizontal column, plugged inside the transverse guide groove formed on the lifting receiving seat, capable of relative sliding, so that, when the lifting receiving seat rises or descends, the receiving swing arm will be pulled to cause the fork-shaped swinging member to swing, and meanwhile cause the drive swing arm to swing vertically, and the drive swing arm having a drive horizontal column; and steering linkages, number of which matching that of the fork-shaped swinging member, said steering linkages pivoted at an eccentric position of the valve rotation actuating seat through a vertical axial pivot, said steering linkages having a transverse swing end; when being moved, said transverse swing end swings laterally, with the vertical axial pivot as the supporting point; further, the transverse swing end is provided with a transverse through hole, for the drive horizontal column of the drive swing arm to plug in, capable of relative sliding in the axial direction; the vertical cross-section of the through hole is rectangular, holding the drive horizontal column inside, with an activity range to move up and down; when the drive swing arm has a lateral displacement due to vertical swing, it pulls the steering linkages to move laterally along a circular path, and meanwhile cause the valve rotation actuating seat to have a transverse rotary motion.

The main efficacy and advantage of the present invention is that, through the technical features of the steering drive device, the vertical up-and-down movement of the pressing-controlled lifting actuator can be transformed, through a steering linkage mechanism, into transverse rotary motion of the valve rotation actuating seat, so that the drive structural form of the pressing-controlled valve core is more in line with the rotary motion of the original valve, and the structural design of the pressing-controlled valve core can be changed flexibly to meet diversified needs in the relevant manufacturer or client end.

DETAILED DESCRIPTION OF THE INVENTION

A preferred embodiment of the present invention of a steering drive device for pressing-controlled valve core is disclosed in FIG. 1 to FIG. 6. It is to be noted, however, that such an embodiment is for the purpose of illustration only, and is not intending to limit the scope of the invention.

The steering drive device is to be installed between a pressing-controlled lifting actuator 20 and a valve rotation actuating seat 30 provided in the shell 10 of a pressing-controlled valve core 100, to transform the up-and-down movement into rotary motion. Among them, said pressing-controlled lifting actuator 20 is a conventional mechanism having the following operational feature: upon every pressing by the user, it will rise or descend for a preset height. As its detailed structural form goes beyond the coverage of the present invention and there are already many types of implementations, no description is provided here.

Figure 10:
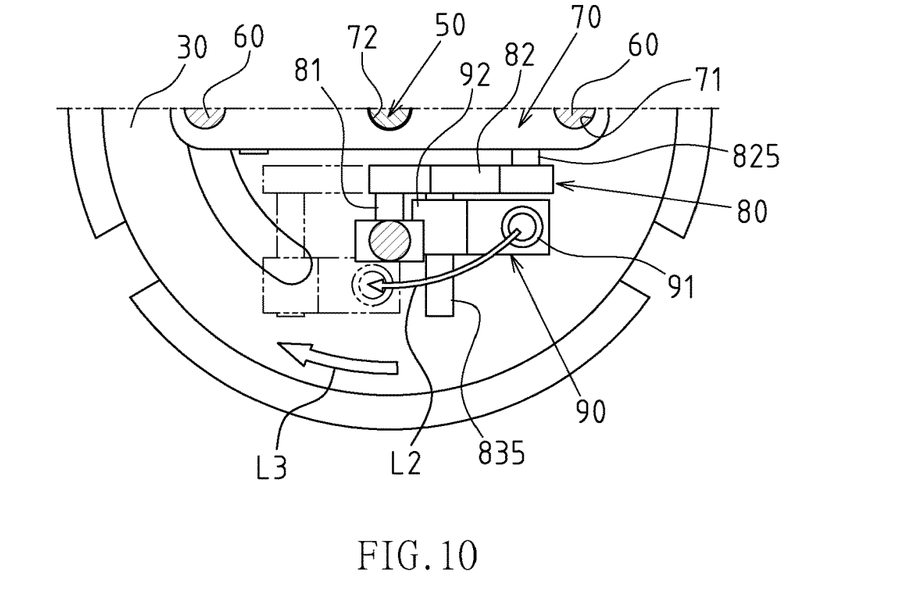
FIG. 10 is a top view of the displacement of the steering linkage of the present invention.

The steering drive device comprises: a fixed top frame 40, installed and positioned inside the shell 10 at a certain height, with a vertical interval separating it from the valve rotation actuating seat 30. The fixed top frame 40 is formed with a vertical through hole 41 facing the pressing-controlled lifting actuator 20. A lifting drive rod 50 is provided, including a rod top 51, a rod body 52 and a rod bottom section 53. The rod top 51 is configured below the pressing-controlled lifting actuator 20 in a linked state, the rod body 52 goes through the vertical through hole 41 formed on the fixed top frame 40, and is capable of moving up and down in the axial direction. At least one vertical guide column 60 is provided wherein the top end of the vertical guide column 60 linked and positioned on the fixed top frame 40, and the lower end of the vertical guide column 60 is extended downward for a preset length in the direction toward the valve rotation actuating seat 30. A lifting receiving seat 70 is configured on the rod bottom section 53 of the lifting drive rod 50. The lifting receiving seat 70 is formed with slide sleeve holes 71, the number of slide sleeve holes 71 matching that of the vertical guide columns 60, so that the slide sleeve holes 71 can be sleeved on the vertical guide columns 60 in a state enabling sliding. The lifting receiving seat 70 is located at a position away from the slide sleeve holes 71, and is formed with a receiving plughole 72 and at least one transverse guide groove 73, wherein the receiving plughole 72 is for the rod bottom section 53 to plug in to form a linked relationship. At least one fork-shaped swinging member 80 is located on the neighboring side of the lifting receiving seat 70. Said fork-shaped swinging member 80 formed with a top end rotational support 81, forking and extending downward to define a receiving swing arm 82 and a drive swing arm 83, wherein said top end rotational support 81 is pivoted on the fixed top frame 40, so that, when being moved, the receiving swing arm 82 and the drive swing arm 83 will swing, with the top end rotational support 81 as the support point. The receiving swing arm 82 has a receiving horizontal column 825, plugged inside the transverse guide groove 73 formed on the lifting receiving seat 70, capable of relative sliding, so that, when the lifting receiving seat 70 rises or descends, the receiving swing arm 82 will be pulled to cause the fork-shaped swinging member 80 to swing, and meanwhile cause the drive swing arm 83 to swing vertically, and the drive swing arm 83 has a drive horizontal column 835. Steering linkages 90 are provided, the number of which matching that of the fork-shaped swinging members 80, said steering linkages 90 pivoted at an eccentric position of the valve rotation actuating seat 30 through a vertical axial pivot 91, said steering linkages 90 having a transverse swing end 92. When being moved, said transverse swing end 92 swings laterally, with the vertical axial pivot 91 as the supporting point. Furthermore, the transverse swing end 92 is provided with a transverse through hole 920, for the drive horizontal column 835 of the drive swing arm 83 to plug in, capable of relative sliding in the axial direction. The vertical cross-section of the through hole 920 is rectangular, holding the drive horizontal column 835 inside, with an activity range to move up and down. When the drive swing arm 83 has a lateral displacement due to vertical swing (as shown in FIG. 10), it will pull the steering linkages 90 to move laterally along a circular path (as indicated by Arrow L2 in FIG. 10), and meanwhile cause the valve rotation actuating seat 30 to have a transverse rotary motion (as indicated by Arrow L3 in FIG. 10).

Figure 6:
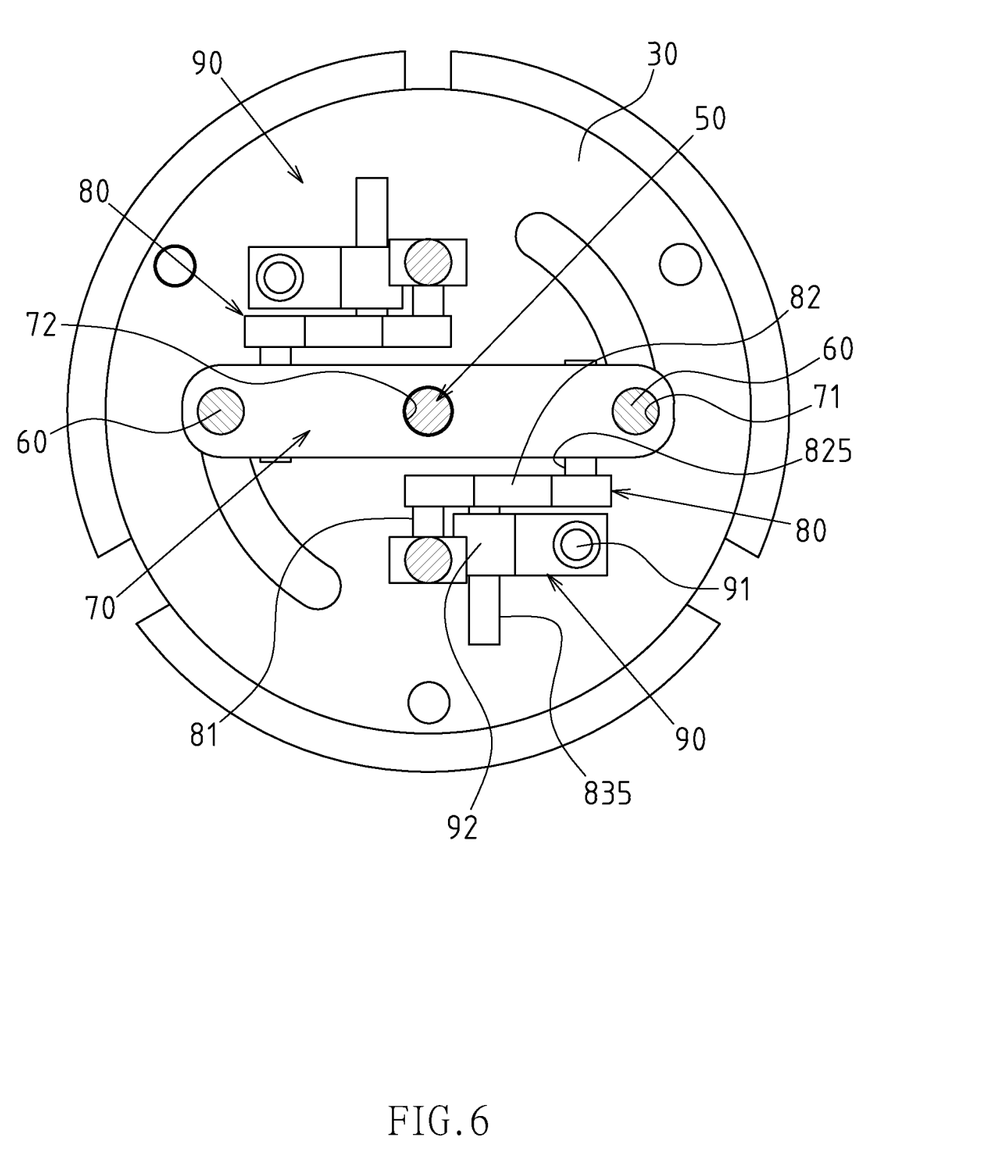
FIG. 6 is a 6-6 sectional view of FIG. 5.

Referring to FIG. 6, in the present embodiment, the vertical guide column 60 is configured as a pair with an interval; the fork-shaped swinging member 80 and the steering linkage 90 are also configured as a pair with an interval, and they are distributed in a form that each is turned laterally for 180 degrees from the other, and they are staggered with a lateral distance. The fork-shaped swinging member 80 and steering linkage 90 disclosed in the present embodiment are implemented as a pair with an interval for balanced drive. It is a preferred embodiment of the present invention. However, in the aspect of feasibility, even if the vertical guide column 60, the fork-shaped swinging member 80 and the steering linkage 90 are configured as a single unit, their individual functional expectations can be realized. Therefore, such an implementation shall still be covered by the scope of the present invention.

Figure 8:
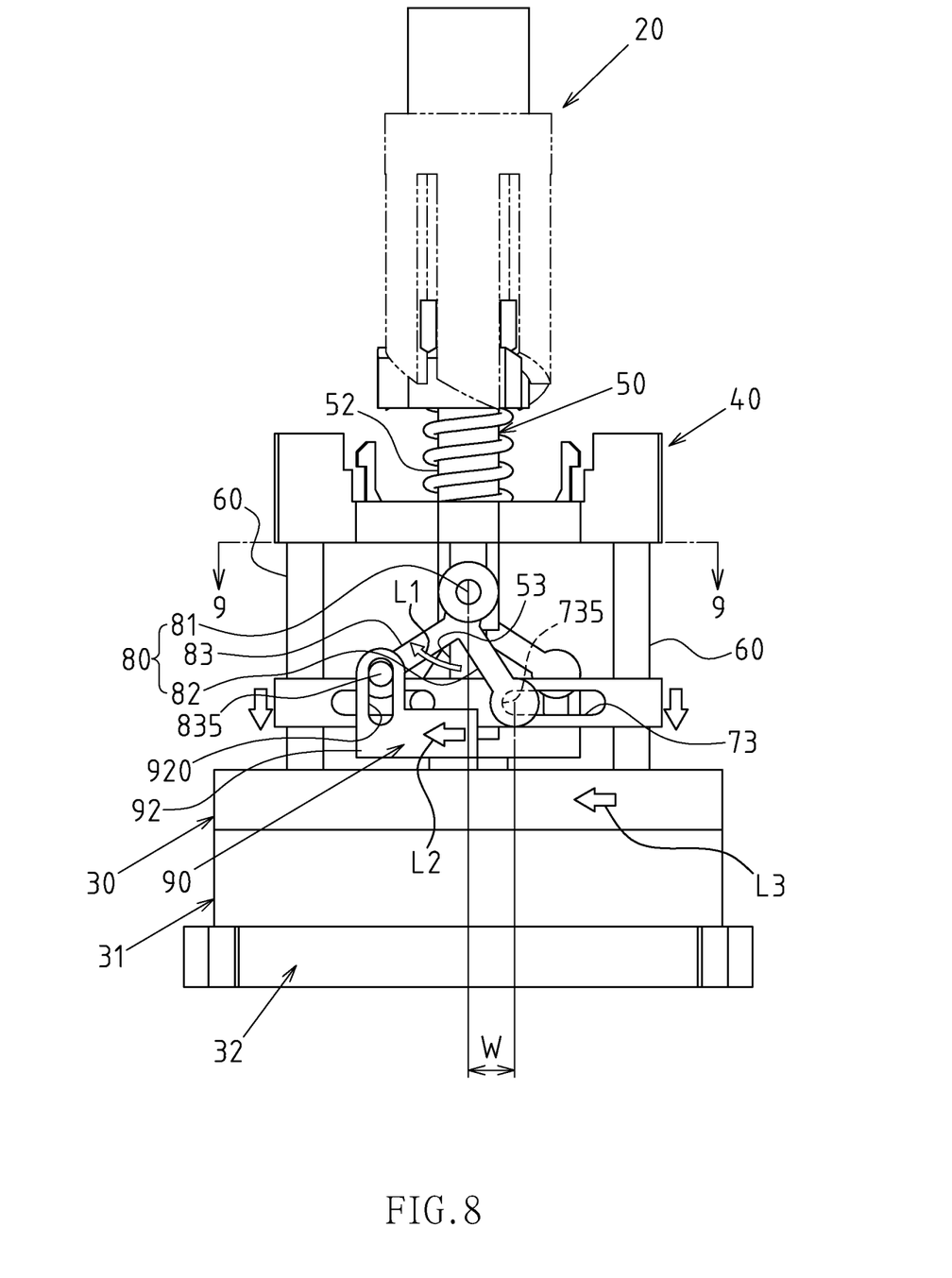
FIG. 8 is a front view corresponding to the state in FIG. 7.

Referring to FIG. 8, in the present embodiment, one end of the transverse guide groove 73 formed on the lifting receiving seat 70 near the receiving plughole 72 is formed with an internal terminal end 735, and the internal terminal end 735 and the top end rotational support 81 formed on the fork-shaped swinging member 80 are staggered laterally (as indicated by Win FIG. 8, i.e., they are not on the same vertical virtual axial line). Thus, when the receiving swing arm 82 swings downward to a preset maximum angle, it must be less than a vertical angle, so as to avoid dead points and getting stuck when the fork-shaped swinging member 80 swings.

Figure 3:
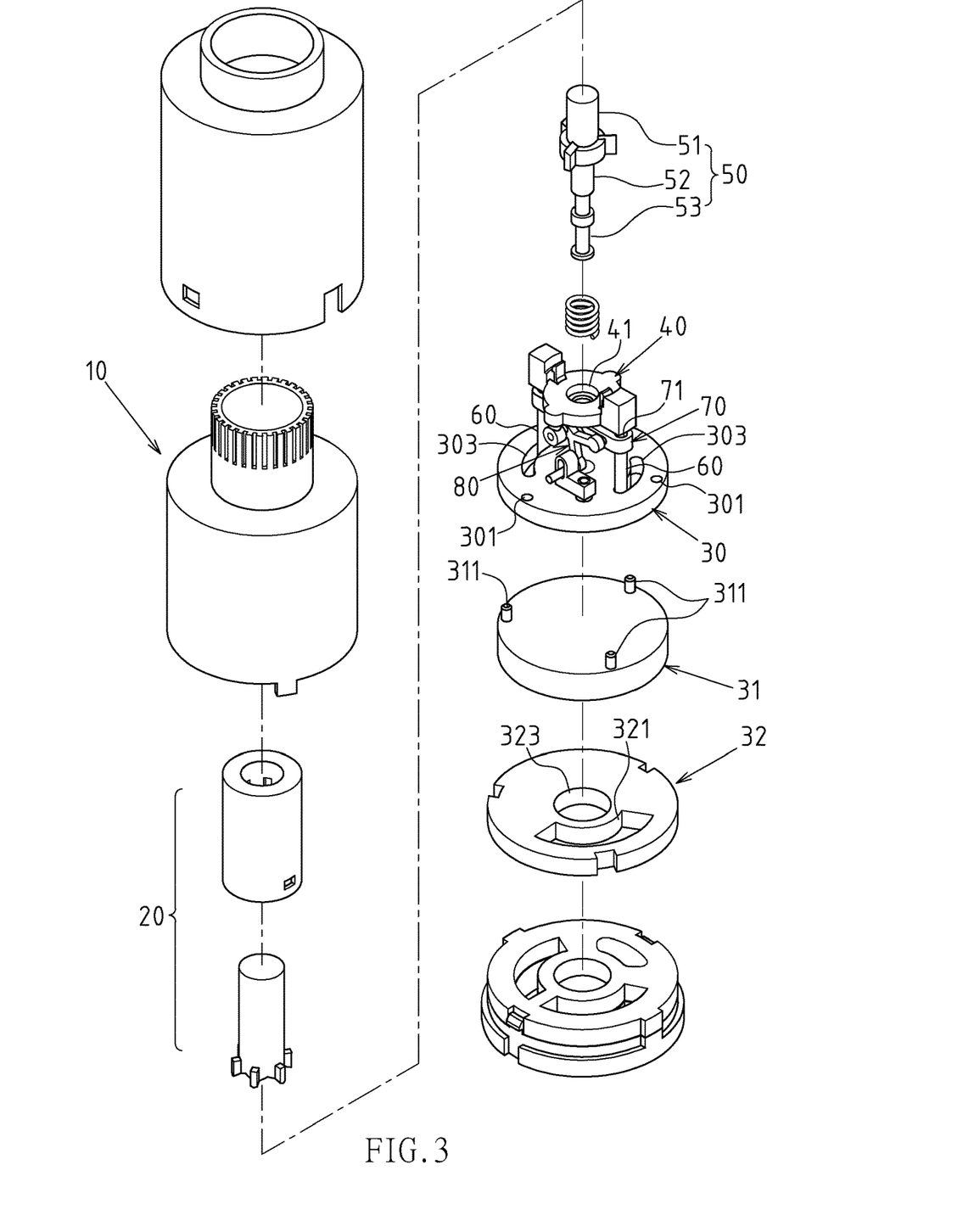
FIG. 3 is an exploded view of the main components of the pressing-controlled valve core as a preferred embodiment of the present invention.
Figure 4:
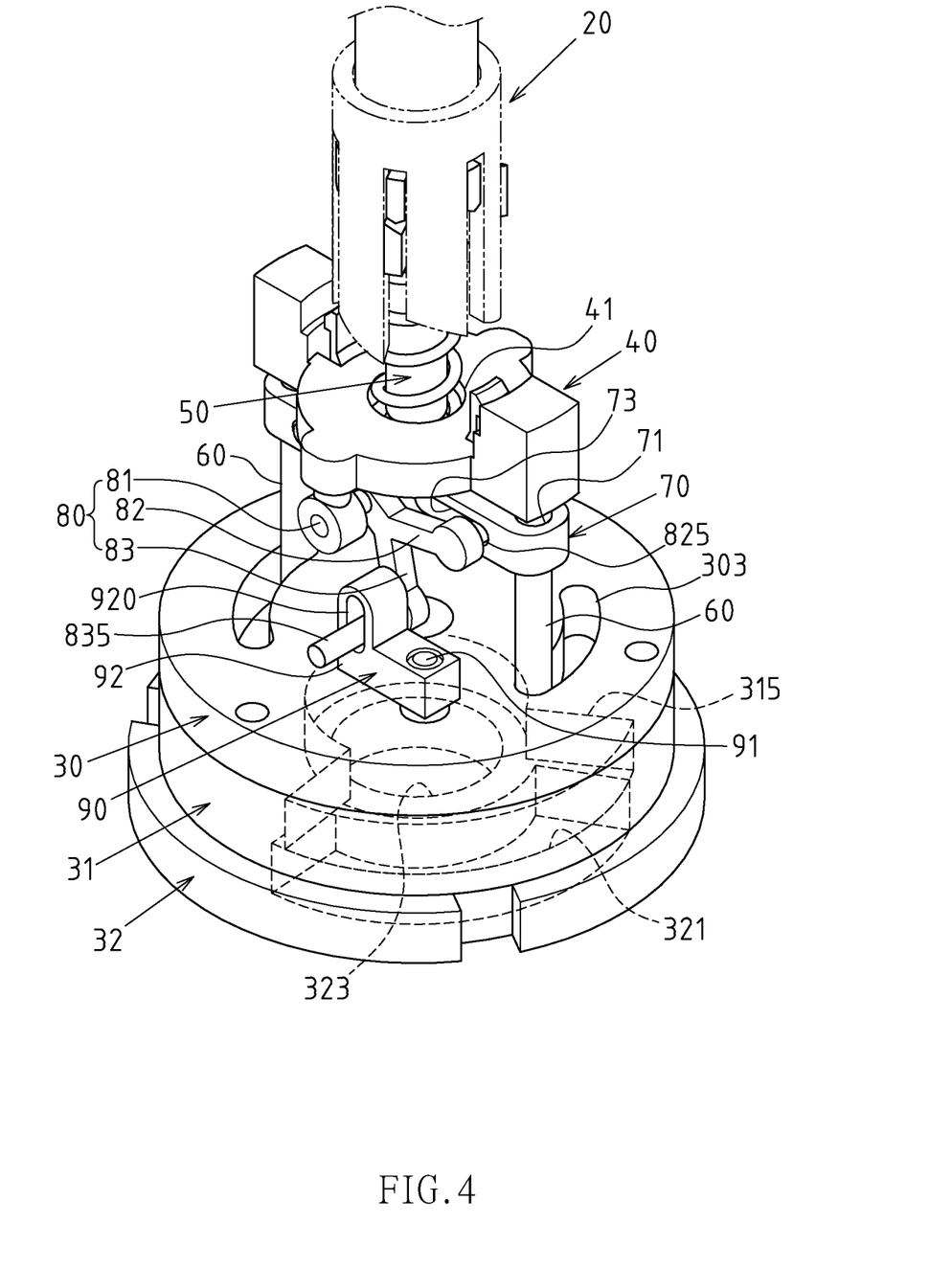
FIG. 4 is a state perspective view of the lifting receiving seat of the present invention in rising mode.
Figure 5:
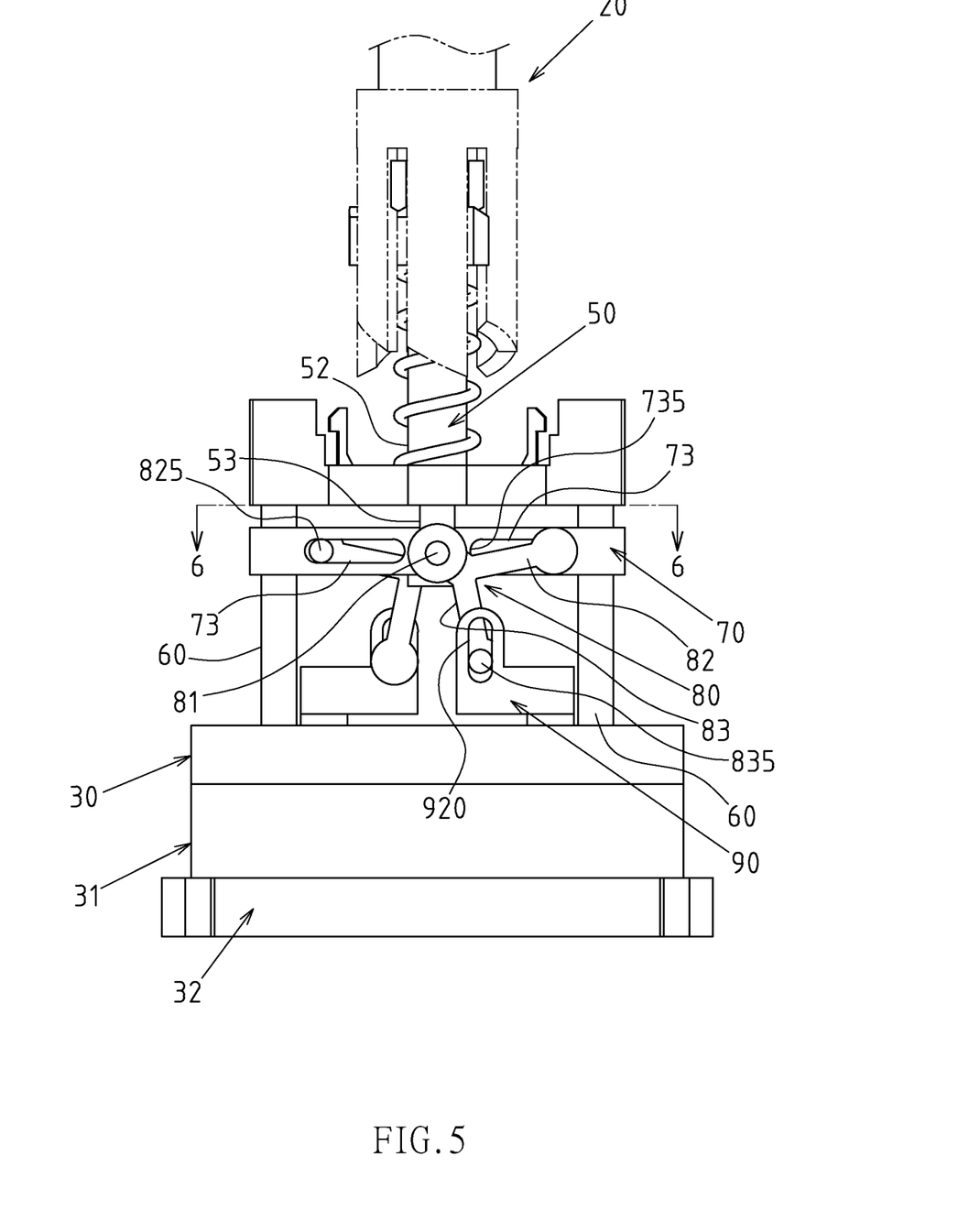
FIG. 5 is a front view corresponding to the state in FIG. 4.
Figure 7:
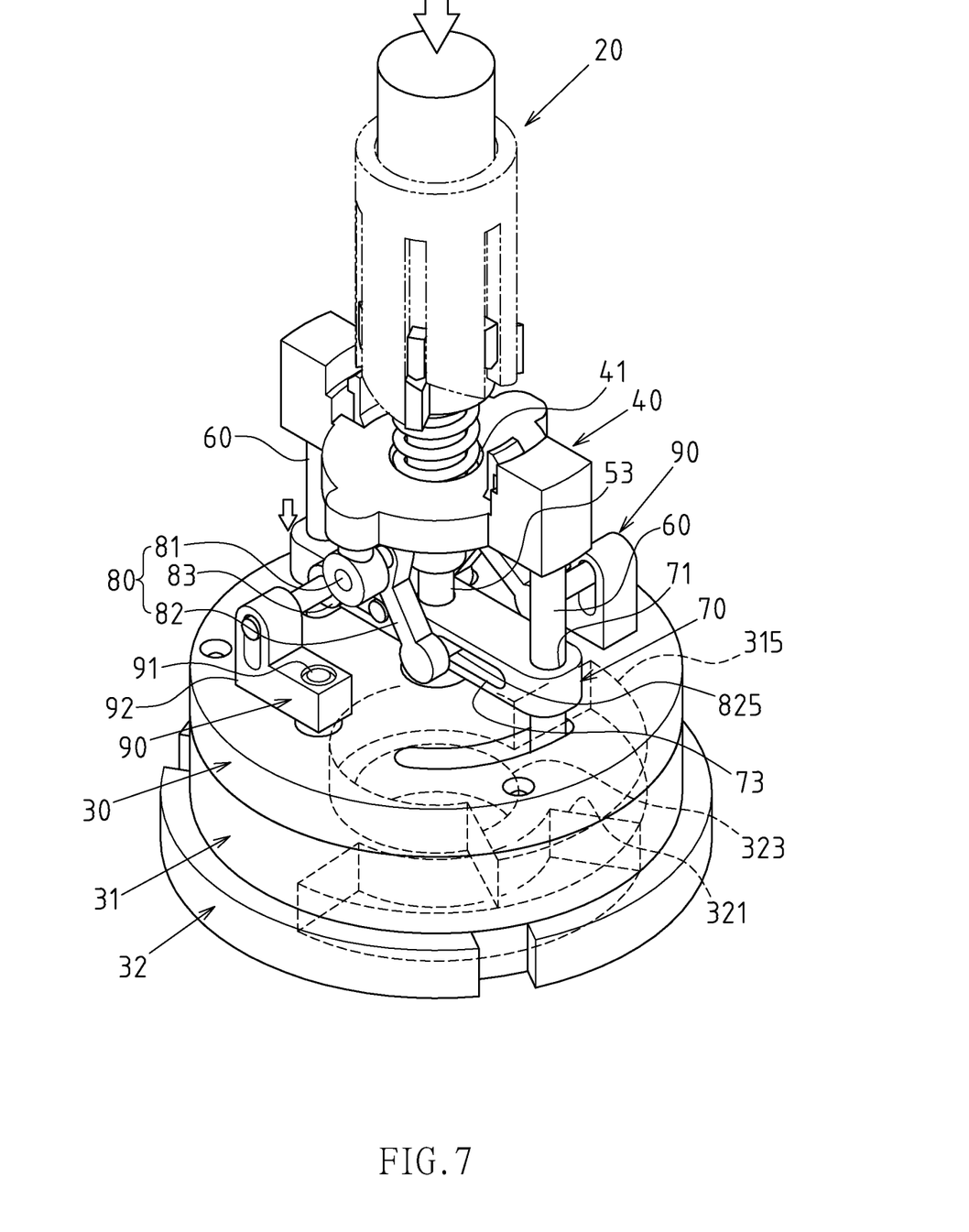
FIG. 7 is a state perspective view of the lifting receiving seat of the present invention is descending mode.

Referring to FIG. 3, FIG. 4 and FIG. 7, in the present embodiment, the lower end of the valve rotation actuating seat 30 is fitted with a rotational ceramic chip 31, and the rotational ceramic chip 31 is stacked above a water control ceramic chip 32, wherein, the valve rotation actuating seat 30 and the rotational ceramic chip 31 are combined through a plurality of matching holes 301 and convex columns 311 for simultaneous movement. The water control ceramic chip 32 is formed with a water inlet guide hole 321 and a water outlet guide hole 323. The bottom of the rotational ceramic chip 31 is formed with a flow-through groove 315. The flow-through groove 315 is communicated to both the water inlet guide hole 321 and the water outlet guide hole 323; when the rotational ceramic chip 31 is driven by the valve rotation actuating seat 30 to rotate, it is used to adjust the flow from the water inlet guide hole 321 into the water outlet guide hole 323. As an additional note: the water control function achieved by the valve rotation actuating seat 30 driving the rotational ceramic chip 31 to rotate as disclosed in the present invention can actually be applied in water tap products of different functional forms, such as controlling the flow rate in cold and hot faucets, or adjusting the mixture of different water source etc. All such applications are feasible embodiments of the present invention and shall be covered in the scope of the present invention. For example, in FIG. 3 of the present invention, below the water control ceramic chip 32, there is a set of unmarked valve components. It is a set of cold and hot water temperature control components matching the water control ceramic chip 32. However, as the cold and hot water temperature adjustment technology is a prior art not covered by the present invention, and does not has an influence on the expected function and performance of the present invention, it is not detailed herein.

Figure 1:
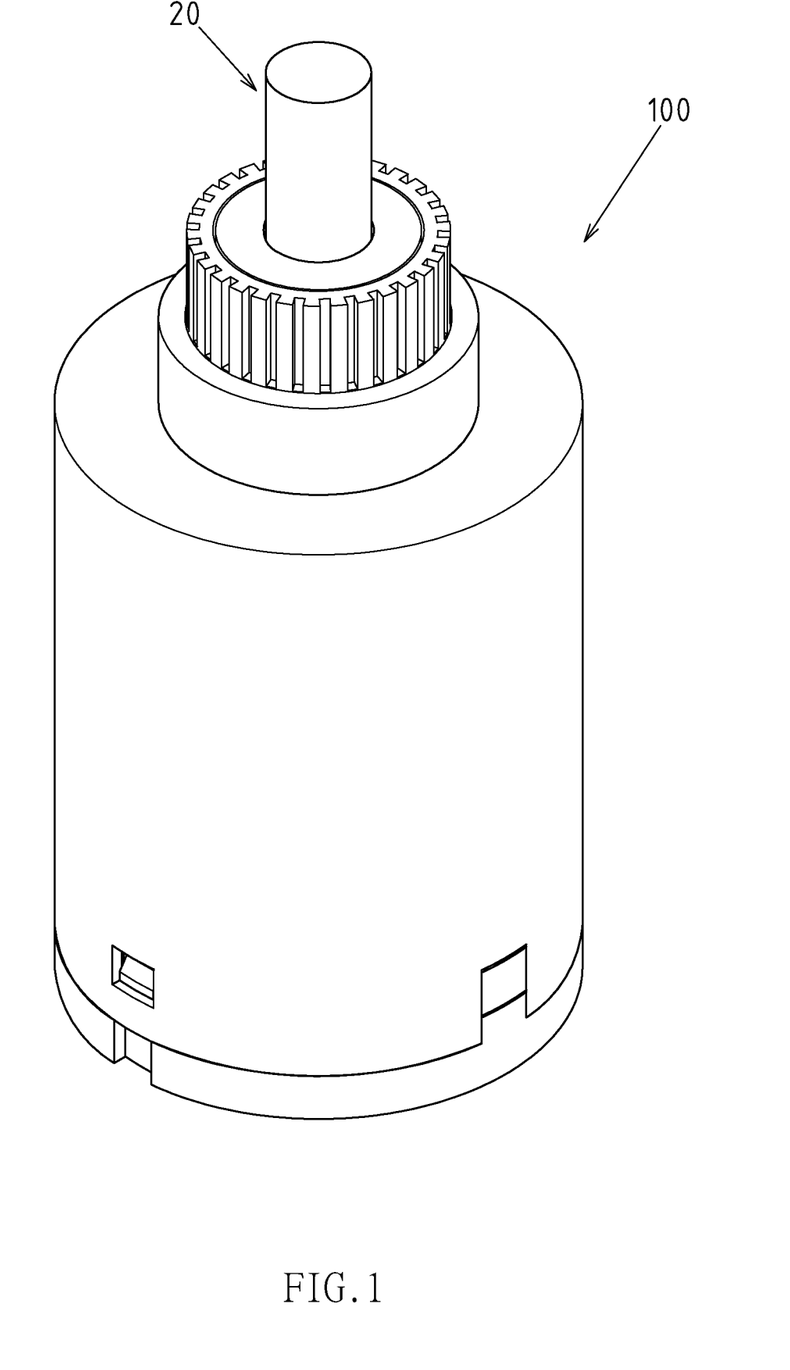
FIG. 1 is a combined perspective view of the pressing-controlled valve core as a preferred embodiment of the present invention.
Figure 2:
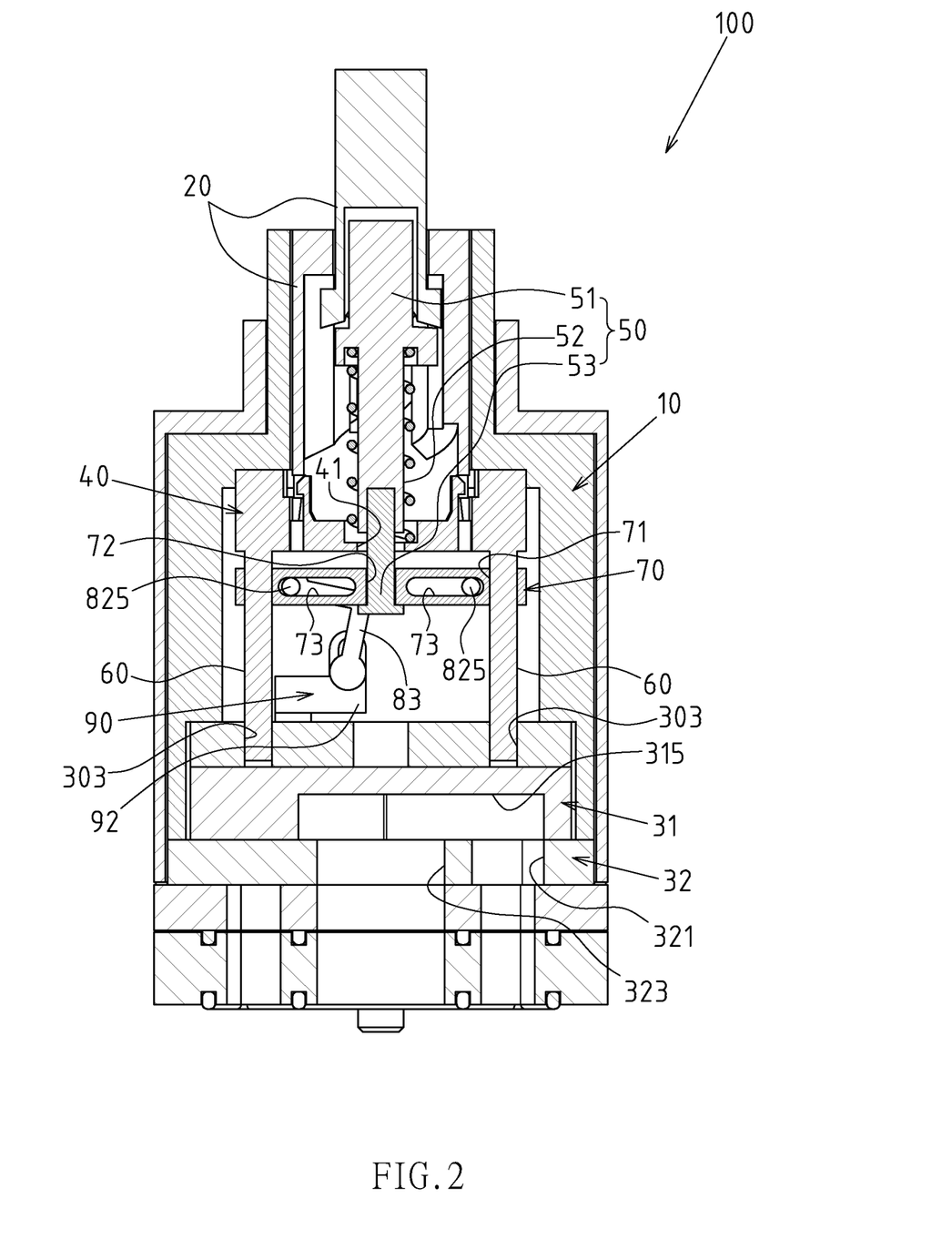
FIG. 2 is a combined sectional view of the pressing-controlled valve core as a preferred embodiment of the present invention.

Referring to FIG. 2, FIG. 3 and FIG. 4, in the present embodiment, the position on the valve rotation actuating seat 30 corresponding to the vertical guide column 60 is formed with an arc groove 303 in the form of a vertical through hole or a vertical concave cavity, so that the lower end of the vertical guide column 60 can be inserted into the arc groove 303. The advantage of this embodiment is that, through the configuration of the arc groove 303 for the lower end of the vertical guide column 60 to insert in, the vertical guide column 60 has a stable limitation, and the lifting receiving seat 70 is provided with a movement guide frame for no consideration of the height range.

Figure 9:
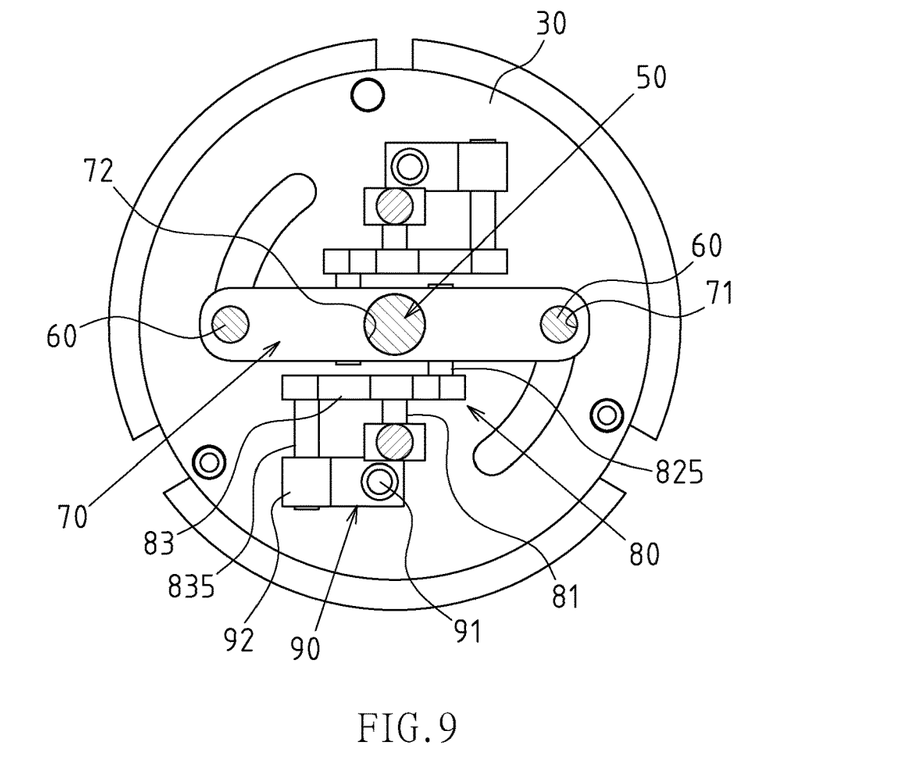
FIG. 9 is a 9-9 sectional view of FIG. 8.

Based on the above structural composition and technical features, the operation of the steering drive device for pressing-controlled valve core disclosed in the present invention is as follows. First, referring to FIG. 4 to FIG. 6, when the pressing state of the pressing-controlled lifting actuator 20 is to raise the lifting receiving seat 70 of the steering drive device, the receiving swing arm 82 of the fork-shaped swinging member 80 will swing upward to the highest position under the guide of the transverse guide groove 73, meanwhile, the drive horizontal column 835 of the drive swing arm 83 is relatively at a position lower than the through hole 920 configured on the transverse swing end 92 of the steering linkage 90; then, referring to FIG. 7 to FIG. 9, when the pressing state of the pressing-controlled lifting actuator 20 is to lower the lifting receiving seat 70 of the steering drive device, the receiving swing arm 82 of the fork-shaped swinging member 80 will swing downward to the preset lowest position under the guide of the transverse guide groove 73, meanwhile, the drive swing arm 83 will relative swing upward (as indicated by Arrow L1 in FIG. 8). This upward swing will cause the drive horizontal column 835 to have an upward movement toward the left side in the figure, and further pull the steering linkage 90 toward the left side in the figure (as indicated by Arrow L2 in FIG. 8 and FIG. 10). When the steering linkage 90 has a displacement, as the vertical axial pivot 91 is pivoted at an eccentric position of the valve rotation actuating seat 30, it will further drive the valve rotation actuating seat 30 to rotate (as indicated by Arrow L3 in FIG. 8 and FIG. 10). As shown in FIG. 10, through the design of the vertical axial pivot 91, during the displacement of the steering linkage 90, the valve rotation actuating seat 30 can relatively swing laterally, so as to transform the vertical swing and pulling of the above drive swing arm 83 into a force to drive the valve rotation actuating seat 30 to rotate.

In summary, the steering drive device disclosed in the present invention can really transform the vertical up-and-down movement of the pressing-controlled lifting actuator 20 into transverse rotary motion of the valve rotation actuating seat 30.

I claim:

1. A steering drive device for a pressing-controlled valve core, the steering drive device being installed between a pressing-controlled lifting actuator and a valve rotation actuating seat provided in a shell of a pressing-controlled valve core, to transform the up-and-down movement into rotary motion; said steering drive device comprises: a fixed top frame, installed and positioned inside the shell at a certain height, with a vertical interval separating it from the valve rotation actuating seat, said fixed top frame being formed with a vertical through hole facing the pressing-controlled lifting actuator; a lifting drive rod, including a rod top, a rod body and a rod bottom section, wherein the rod top is configured below the pressing-controlled lifting actuator in a linked state, the rod body goes through the vertical through hole formed on the fixed top frame, capable of moving up and down in the axial direction; at least one vertical guide column, a top end of said at least one vertical guide column linked and positioned on the fixed top frame, a lower end of said at least one vertical guide column is extended downward for a preset length in a direction toward the valve rotation actuating seat; a lifting receiving seat, configured on the rod bottom section of the lifting drive rod, said lifting receiving seat formed with slide sleeve holes, the number of slide sleeve holes matching that of the vertical guide columns, so that the slide sleeve holes can be sleeved on the vertical guide columns in a state enabling sliding, said lifting receiving seat being located at a position away from the slide sleeve holes and formed with a receiving plughole and at least one transverse guide groove, wherein said receiving plughole is for the rod bottom section to plug in to form a linked relationship; at least one fork-shaped swinging member, located on a neighboring side of the lifting receiving seat, said at least one fork-shaped swinging member formed with a top end rotational support, forking and extending downward to define a receiving swing arm and a drive swing arm, wherein said top end rotational support is pivoted on the fixed top frame, so that, when being moved, the receiving swing arm and the drive swing arm will swing, with the top end rotational support as the support point; the receiving swing arm having a receiving horizontal column, plugged inside the at least one transverse guide groove formed on the lifting receiving seat, capable of relative sliding, so that, when the lifting receiving seat rises or descends, the receiving swing arm will be pulled to cause the at least one fork-shaped swinging member to swing, and meanwhile cause the drive swing arm to swing vertically, and the drive swing arm having a drive horizontal column; and steering linkages, number of which matching that of the at least one fork-shaped swinging member, said steering linkages pivoted at an eccentric position of the valve rotation actuating seat through a vertical axial pivot, said steering linkages having a transverse swing end; when being moved, said transverse swing end swings laterally, with the vertical axial pivot as the supporting point; further, the transverse swing end is provided with a transverse through hole, for the drive horizontal column of the drive swing arm to plug in, capable of relative sliding in the axial direction; the vertical cross-section of the through hole is rectangular, holding the drive horizontal column inside, with an activity range to move up and down; when the drive swing arm has a lateral displacement due to vertical swing, it pulls the steering linkages to move laterally along a circular path, and meanwhile cause the valve rotation actuating seat to have a transverse rotary motion.

2. The steering drive device for pressing-controlled valve core defined in claim 1, wherein said at least one vertical guide column is configured as a pair with an interval; said at least one fork-shaped swinging member and said steering linkages are also configured as a pair with an interval, and they are distributed in a form that each is turned laterally for 180 degrees from the other, and they are staggered with a lateral distance.

3. The steering drive device for pressing-controlled valve core defined in claim 1, wherein, one end of the at least one transverse guide groove formed on the lifting receiving seat near the receiving plughole is formed with an internal terminal end, and the internal terminal end and the top end rotational support formed on the at least one fork-shaped swinging member are staggered laterally, so that, when the receiving swing arm swings downward to a preset maximum angle, it must be less than a vertical angle, so as to avoid dead points and getting stuck when the at least one fork-shaped swinging member swings.

4. The steering drive device for pressing-controlled valve core defined in claim 1,
   wherein, the lower end of the valve rotation actuating seat is fitted with a rotational ceramic chip, and the rotational ceramic chip is stacked above a water control ceramic chip, wherein the valve rotation actuating seat and the rotational ceramic chip are combined through a plurality of matching holes and convex columns for simultaneous movement, said water control ceramic chip is formed with a water inlet guide hole and a water outlet guide hole, the bottom of said rotational ceramic chip is formed with a flow-through groove, said flow-through groove is communicated to both the water inlet guide hole and the water outlet guide hole; when the rotational ceramic chip is driven by the valve rotation actuating seat to rotate, it is used to adjust the flow from the water inlet guide hole into the water outlet guide hole.

5. The steering drive device for pressing-controlled valve core defined in claim 1, wherein, the position on the valve rotation actuating seat corresponding to the vertical guide column is formed with an arc groove in the form of a vertical through hole or a vertical concave cavity, so that the lower end of the at least one vertical guide column can be inserted into the arc groove.

\* \* \* \* \*